United States Patent [19]

Yoshimura

[11] Patent Number: 4,859,954

[45] Date of Patent: Aug. 22, 1989

[54] CLOCK PHASE ADJUSTING SYSTEM

[75] Inventor: Tatsuro Yoshimura, Yokohama, Japan

[73] Assignee: Fujitsu Limited, Kawasaki, Japan

[21] Appl. No.: 256,171

[22] Filed: Oct. 7, 1988

Related U.S. Application Data

[63] Continuation of Ser. No. 55,740, May 4, 1987, abandoned.

[30] Foreign Application Priority Data

Sep. 4, 1985 [JP] Japan ................. 60-195171

[51] Int. Cl.$^4$ ...................... H03K 5/13; H03K 5/159; H03K 5/00; H03L 7/00
[52] U.S. Cl. ..................................... 328/155; 328/55; 328/56; 307/602; 307/603; 307/605; 307/606; 307/511; 307/262
[58] Field of Search ............... 307/602, 603, 605, 606, 307/262, 511; 328/55, 56, 155

[56] References Cited

U.S. PATENT DOCUMENTS

| | | | |
|---|---|---|---|
| 4,165,490 | 8/1979 | Howe, Jr. et al. ..................... | 328/58 |
| 4,290,022 | 9/1981 | Puckette ............................... | 328/55 |
| 4,580,066 | 4/1986 | Berndt ................................... | 371/25 |
| 4,580,137 | 4/1986 | Fedler et al. ......................... | 371/25 |
| 4,677,499 | 6/1987 | Shirota et al. ....................... | 307/602 |
| 4,700,347 | 10/1987 | Rettberg et al. ................... | 328/55 |

FOREIGN PATENT DOCUMENTS

| | | |
|---|---|---|
| 565684 | 9/1987 | Australia . |
| 0117735 | 9/1984 | European Pat. Off. . |
| 201055 | 6/1979 | United Kingdom . |
| 2050644 | 1/1981 | United Kingdom . |

OTHER PUBLICATIONS

DasGupta, "LSSD Scan Technique", vol. 24, No. 8, Jan. 1982, IBM Tech. Disclosure Bulletin.
Hahn et al, "VLSI Testing by On—Clip Error Detection", IBM Tech Disclosure Bulletin, vol. 25, No. 2, Jul. 1982.

Primary Examiner—Stanley D. Miller
Assistant Examiner—Trong Quang Phan
Attorney, Agent, or Firm—Staas & Halsey

[57] ABSTRACT

A clock phase adjusting system is provided, including: a scan in/our apparatus, having (n+1) special scan-out latch circuits; a first delay device which selectively outputs an input clock as a delay clock output of a maximum $m=2^n$ steps in accordance with an (n) bit selection signal; a second delay device which selectively outputs the input clock signal as the delay clock signals of further minimum $1/2^P$ steps of a minimum step width by the first delay device in accordance with the (P) bit selection signal and which is connected in cascade with the first delay device, so that the delayed clock signals of $1/2^P$ steps are output as the input clock signal by only setting, in the (n+p) scan in/out latch circuits, the selection data for obtaining a delay clock signal.

4 Claims, 8 Drawing Sheets

CLOCK PHASE ADJUSTING SYSTEM

This is a continuation of co-pending application Ser. No. 055,740 filed on May 4, 1987 and now abandoned.

BACKGROUND OF THE INVENTION

The present invention relates to a clock phase adjusting system, and especially to a system for adjusting a clock signal in an information processing system.

Usually, the main functions of an information processing system, such as operational processing, information holding, etc., in a central processing unit (hereinafter called CPU) can be achieved by a logic circuit formed by semiconductor elements.

This logic circuit is realized by combining many combination circuits, such as OR/NOR gates, and sequential circuits formed by registers, latches, flip-flops (hereinafter called FF) etc., with a plurality of other combination circuits.

The above-mentioned combination circuits can obtain an output signal only by an operation delay time in each element, but in a sequence circuit, the output signal can be obtained when the input data is set by another clock signal, after the input data is applied.

In the usual CPU etc., as is well known, usually a synchronizing system using a clock signal having a constant period is used.

Recently, in accordance with the propagation and development of information processing systems, devices must be manufactured with a small size and at a low cost. On the other hand, if an improvement of a throughput of the CPU etc., is required, then a system having a high speed and large scale must be formed.

Conventionally, a high speed and large scale information processing system is obtained by improvements of system designs, high speed semiconductor elements, and better integration techniques, that is, the realization of a large scale integration circuit (LSI).

The large scale integration circuit provides a high integration with a low cost, and further the above-mentioned logic circuit can be realized with a uniform operational characteristic and high reliability.

The high speed and large scale system is, however, formed by the above-mentioned combination circuit using a large number of semiconductor elements. Therefore, because many semiconductor elements are integrated in the logic circuit, and these elements inevitably have varying operational characteristics, especially the operation time, there is an inevitable slight affect on a margin of the timing of a clock signal in the CPU, etc.

Further, the high speed of the information processing system becomes such that the delay times due to wiring lengths cannot be neglected. Therefore, in the present state, the clock signal of the logic circuit is obtained by distributing a plurality of clock signal having a predetermined delay time via a so-called phase adjusting circuit.

In this case, in the logic circuit distributes the delayed clocks, a clock delay which is inherent to each logic circuit is required. Therefore, in the above-mentioned phase adjusting circuit, a clock signal having a desired delay period must be supplied in accordance with the logic circuit for supplying the clock.

However, in the large scale integration circuit having a conventional phase adjusting circuit, the number of gates included therein is restricted, and further, the number of external draw out terminals in a printed circuit board is also restricted. From this point of view, preferably the number (n) of the terminals of the above-mentioned phase adjusting circuit is restricted, and therefore, the problem arises of a conflict in the coexistence of such a circuit in the LSI.

Further, from the viewpoint of the package in the high density arrangement of the printed circuit board, etc., mounting the LSI mentioned above, it is not desirable from the viewpoint of reliability that the connections in the selected terminal be changed.

That is, ① if a connection change is attempted by using a short circuit, space for the short circuit is required in the package, and the package efficiency is decreased. ② If the connection change is attempted by using a wiring change, the operating efficiency is decreased. ③ The short circuit or wiring change causes a problem in the reliability of the connecting terminal.

SUMMARY OF THE INVENTION

In the present invention, in consideration of the above-mentioned conventional drawbacks, an efficient coexistence in the LSI is realized without restricting a miniaturization of delay time (tp) and an increase of (n) expected from the phase adjusting circuit because of the phase adjusting. Accordingly, an object of the invention provides a phase adjusting system including a well known scan in/out means for easily locating a fault position in a logic circuit such as a usual LSI, etc., so that the number of the external draw out terminals for the phase adjusting is restricted to a minimum, and carrying out the work for selecting the terminals for adjusting the phase.

According to the present invention, when the phase of the clock signal is adjusted, a selection of the selection adjusting terminal for (m) steps corresponding to a coarse adjustment is obtained by a first delay means. A selection signal having (n) bits is scanned in the form of $m = 2^{(n)}$ to n scan out circuits for latching, and in a fine adjusting within one step. The selection of a $1/2^P$ step is obtained by a second delay means in which (p) bits are latched to (p) scan in-out registers, and as a result, a delayed clock signal in a $1/2^P$ step can be obtained as an input clock signal in the delay adjusting range of $0-(m-1/2^P)$.

Further, if the present invention is commonly used as a scan in/out means in the logic circuit for scanning the selected data for phase adjusting, it is not especially necessary to provide a terminal for applying the select data for the phase adjusting, and thus the phase adjusting circuit can coexist with the logic circuit in the LSI.

Further, if the selected data which is first sent to the second delay means, mentioned above, for adjusting the phase is realized by, for example, firmware, a clock phase adjusting system having a high reliability can be included in the high density package without a wiring change.

DETAILED DESCRIPTION OF THE PREFERRED EMBODIMENTS

Figure 1A:
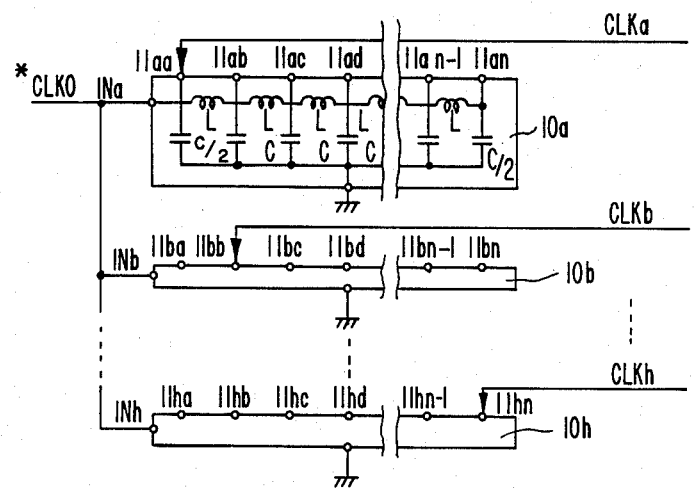
FIGS. 1A and 1B are schematic diagrams showing one example of a conventional clock phase adjusting system.
Figure 1B:
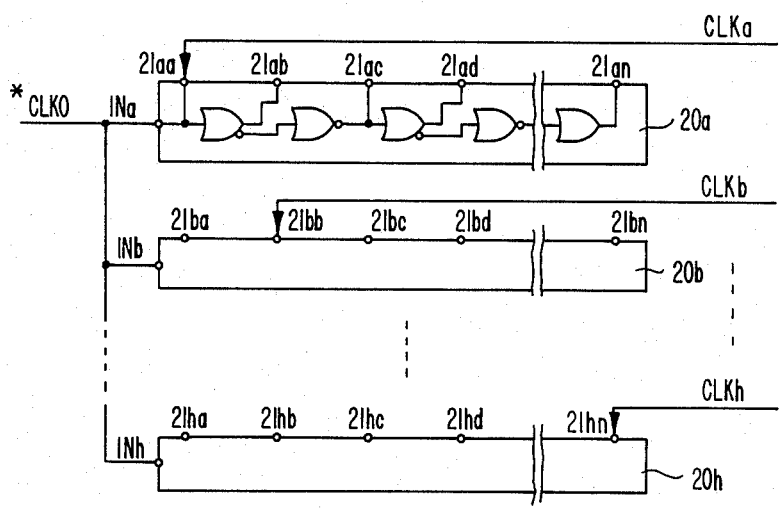

FIGS. 1A and 1B are schematic diagrams showing examples of a conventional phase adjusting system.

FIG. 1A is an example of a phase adjusting circuit using an inductive line (L) and a capacitance (C), and FIG. 1B is an example of a phase adjusting circuit using OR/NOR gates.

In the phase adjusting circuits $10a$-$10h$ shown in FIG. 1A, cascade delay times between each unit section of L and C ae based on a constant, or a distributed constant is selected by adjusting terminals $11aa$-$11an$, ..., $11ha$-$11hn$, and CLKa-CLKh having respectively a predetermined delay time are output as the standard clock signal *CLK0 to be input. Wherein CLK0≈CLKa.

In the phase adjusting circuit $20a$-$20h$ shown in FIG. 1B, cascade delay times using a plurality of OR/NOR gates are selected by adjusting terminals $21aa$-$21hn$.

These are logically functioned in a phase adjusting circuit, but when included in an LSI, the logic circuit can use common OR/NOR circuits, and thus the later phase adjusting circuits $20a$-$20h$ which can be easily realized are frequently used.

However, even in the later circuits $20a$-$20h$, for the phase adjusting, since a pitch due to the delay time (tp) per gate is restricted by the delay time of the gate which is used, then the pitch is easily used when made as small as possible and the range of the adjusting time is made larger. Then the number (n) of the adjusting terminals also must be made large, from the following relationship $$T = tp \cdot n$$

Embodiments of the present invention will be explained in detail with reference to the drawings.

Figure 2A:
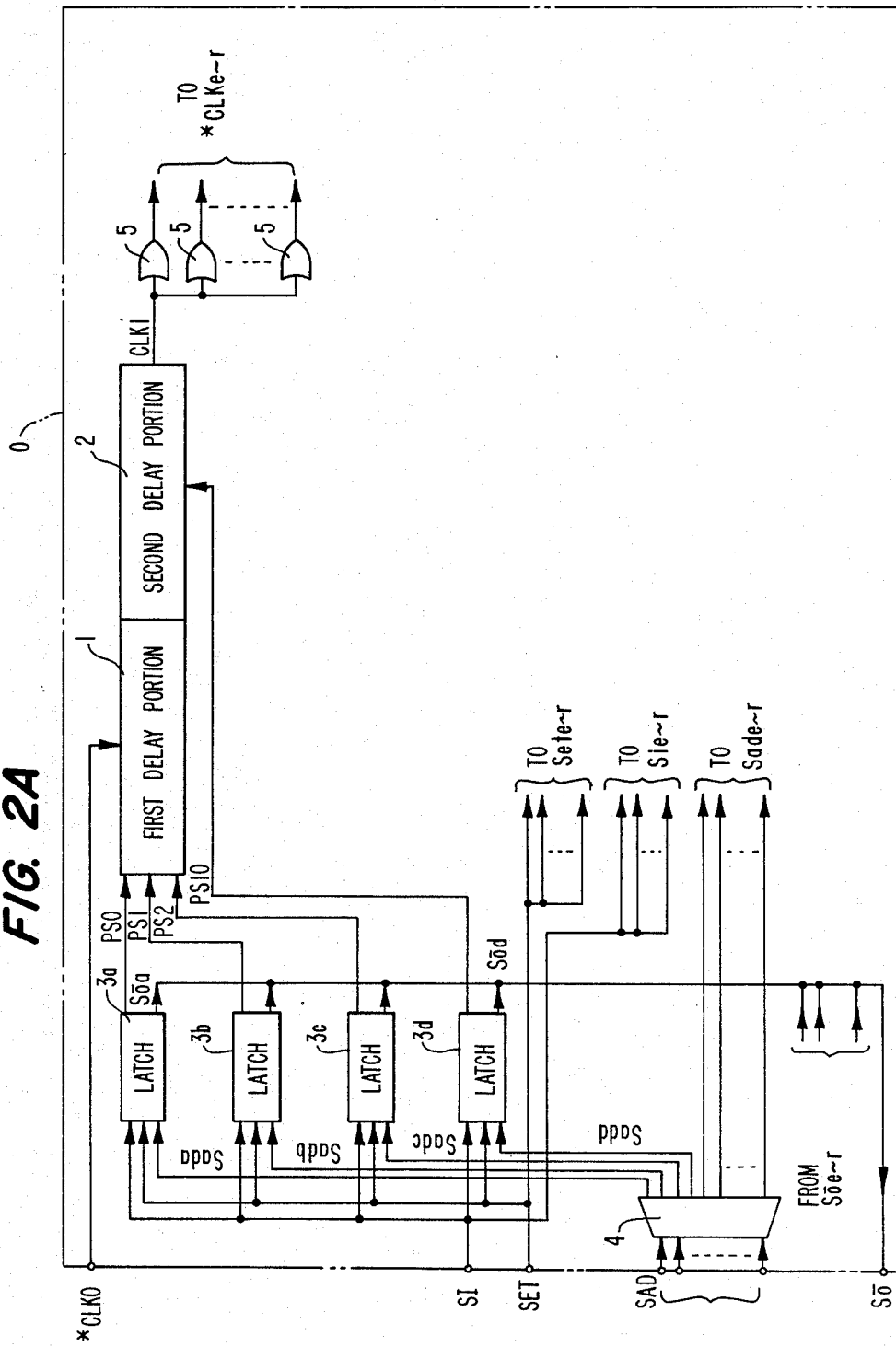
FIGS. 2A and 2B are block diagrams showing two embodiments of the system according to the present invention.
Figure 2B:
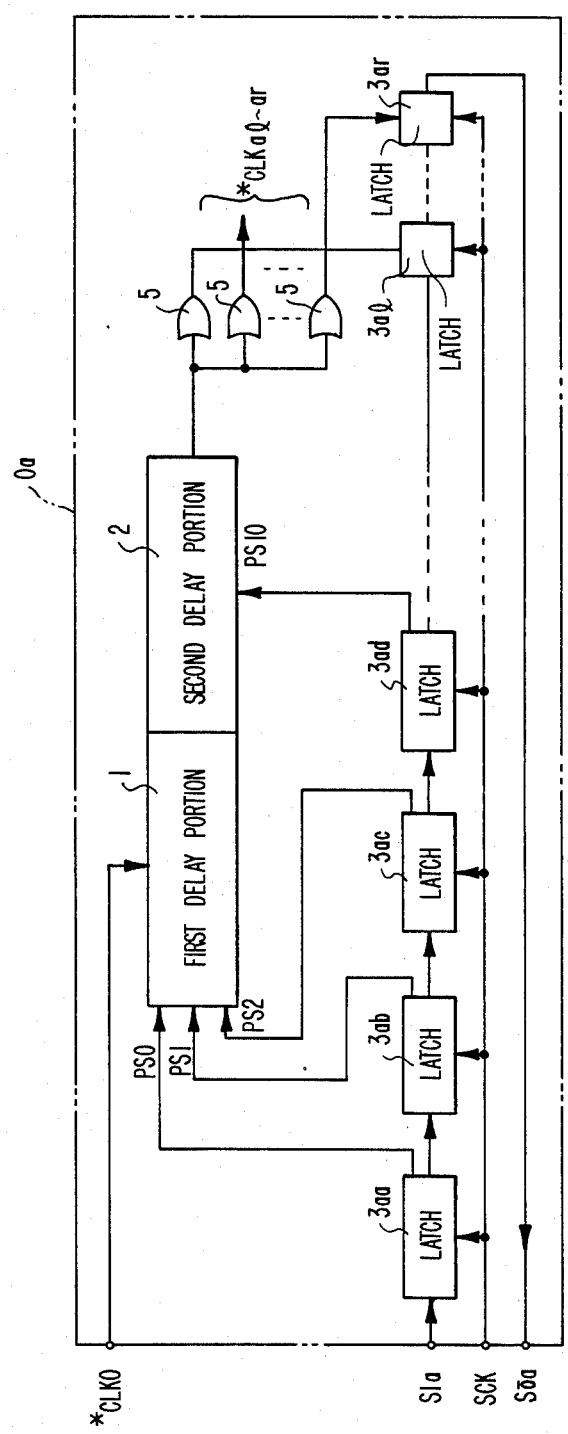

FIGS. 2A and 2B are block diagrams of the embodiments of the present invention. In the embodiment of the phase adjust system shown in FIG. 2A, an input means of a selected data, for setting the delay time given to a basic input clock signal *CLK0, is realized by a scan-in, due to an address system (parallel system). FIG. 2B shows a system in which the input means of the selected data is realized by a scan-in, due to a shift register system (series system). Note, throughout the drawings, the same symbols designate the same elements.

In FIGS. 2A and 2B, 0, $0a$ show an information processing device, or an intermediate package body of the narrower function block of the information processing device, such as an assembly of a printed circuit board or the afore-mentioned LSI.

Further, in the scan-in operation by the above-mentioned series/parallel system, it is assumed that a small number of scan in/out latch circuits $3a$-$3d$, $3aa$-$3ad$ are added to the scan in/out function of the conventional device 0, $0a$, and the scan in/out function of the conventional device is used as is.

Figure 3A:
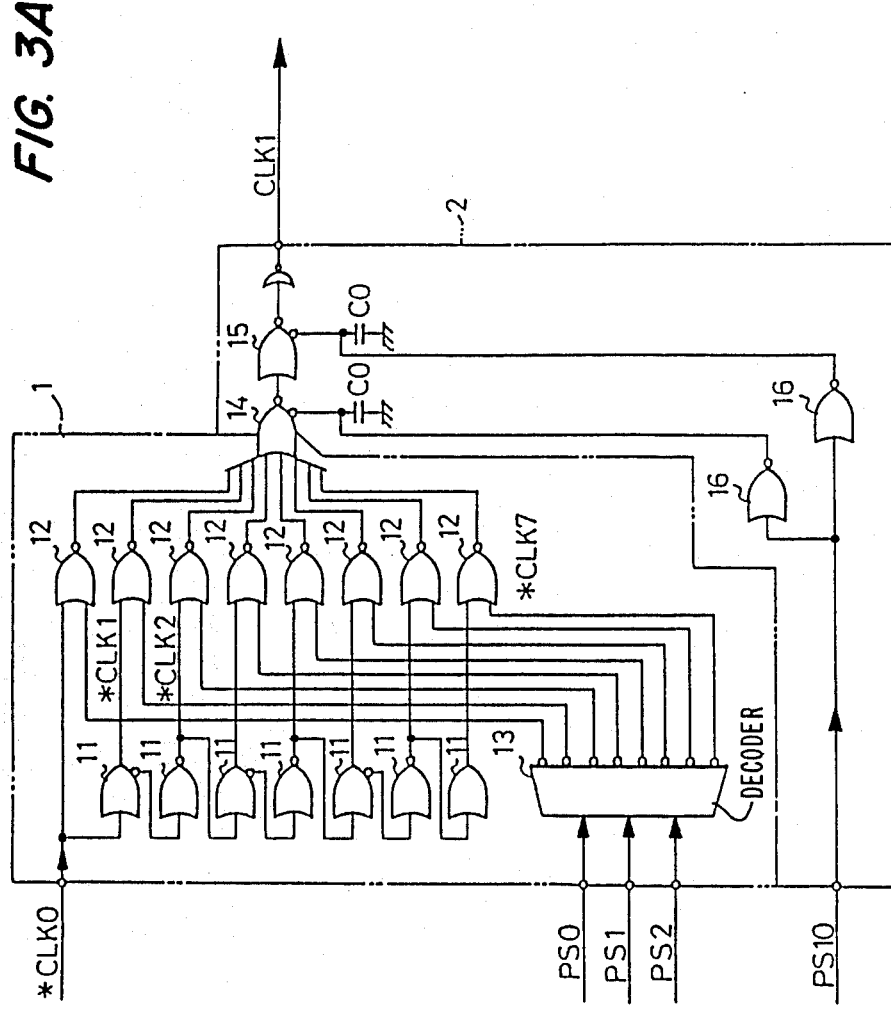
FIGS. 3A, 3B and 3C are schematic diagrams showing the construction of examples of a first delay portion and a second delay portion in FIGS. 2A and 2B; and, FIGS. 4A and 4B are block diagrams of a further two embodiments of the system according to the present invention.
Figure 3B:
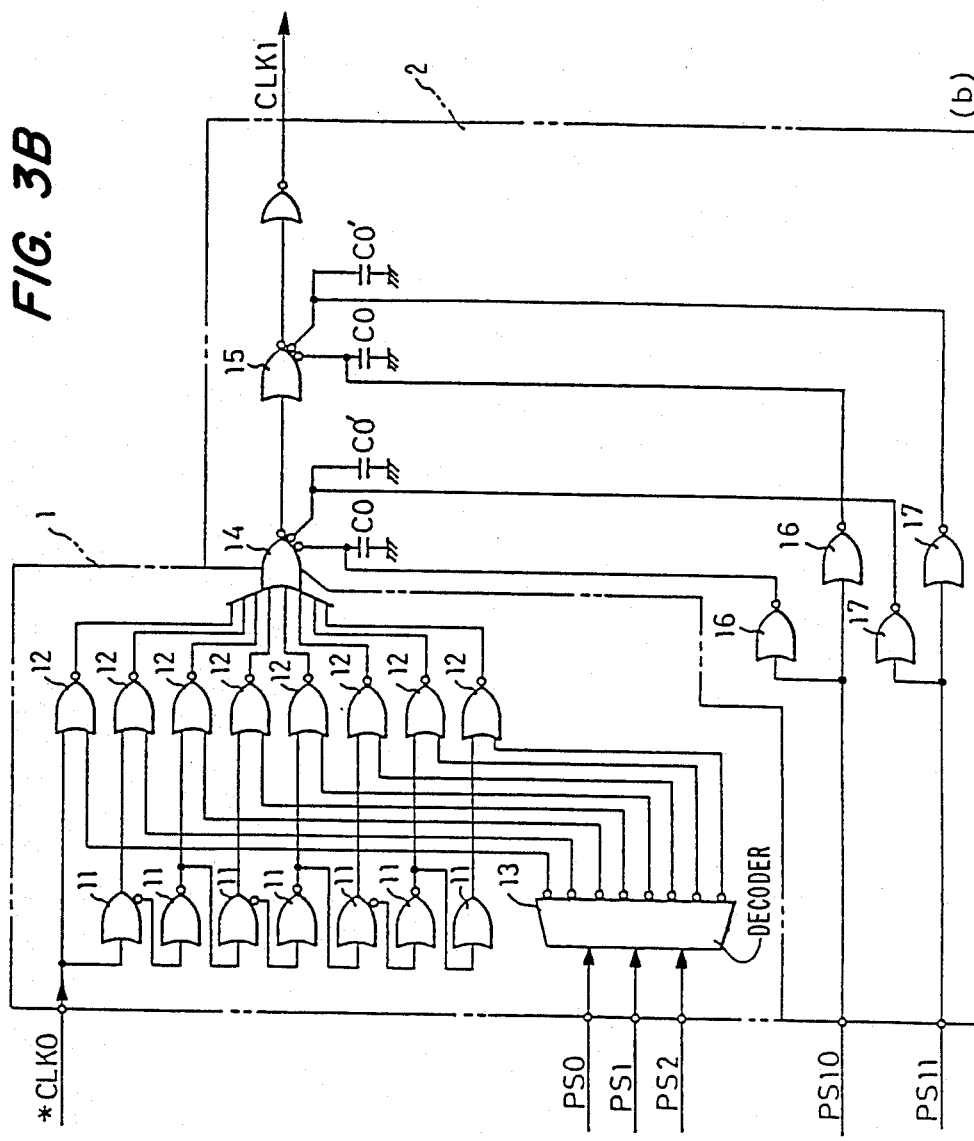
Figure 3C:
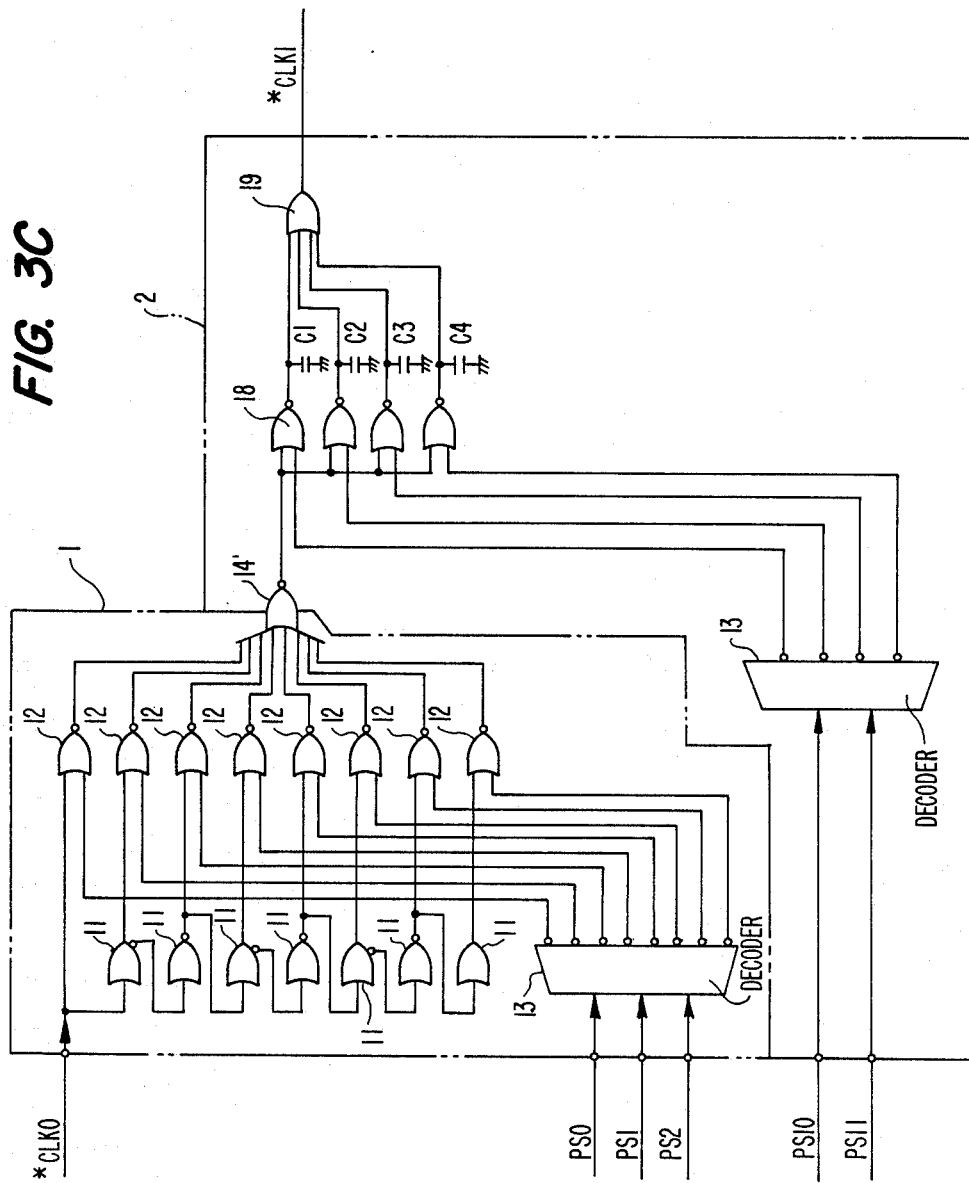

FIGS. 3A, 3B, and 3C are schematic diagrams of examples of constructions of a first delay portion 1 in FIGS. 2A and 2B and of a second delay portion 2 connected to the first delay portion 1.

Figure 4A:
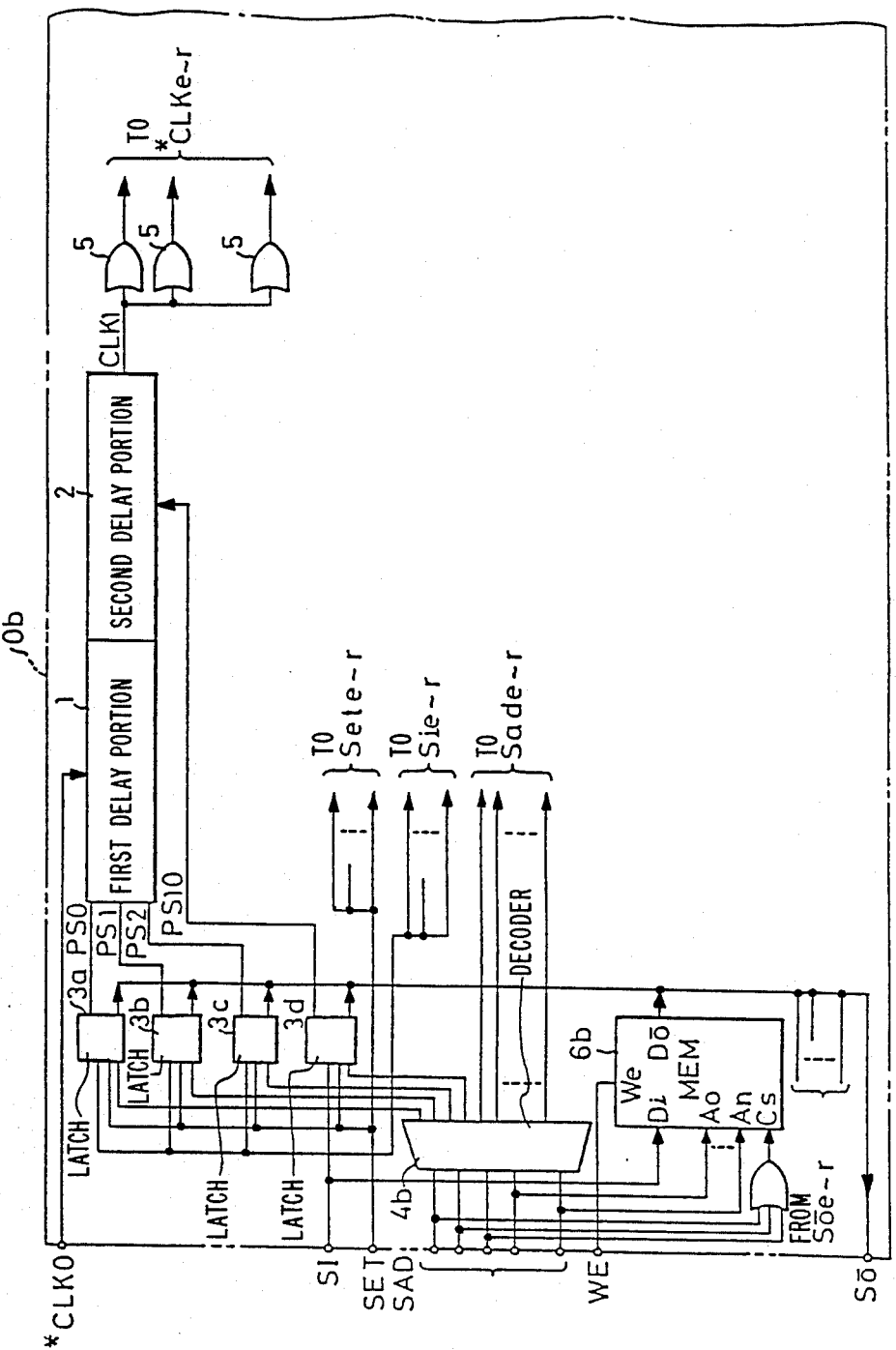
Figure 4B:
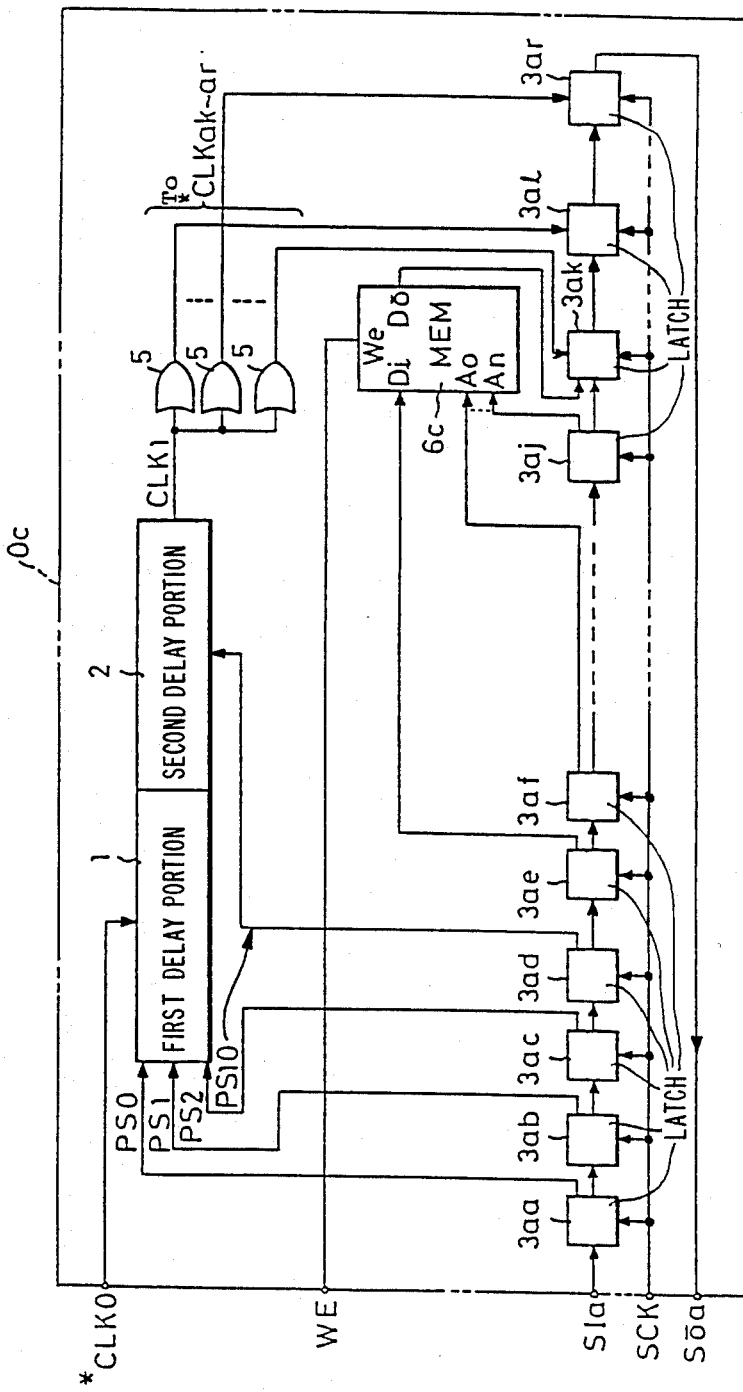

Further, FIGS. 4A and 4B are block diagrams of other embodiments of the present invention.

First, in FIG. 3A, a clock signal which is input to the *CLK0 terminal of the first delay portion 1 is input to cascade (m−1) OR/NOR gates 11, and each input and output signal is applied to (m) OR gates 12, wherein 8 OR gates are illustrated. Next, "0" is output at any one output among the output signals of selection signals $2^3 = 8$ developed at a decoder 13, which inputs an (n) bits phase adjusting signal, here, 3 bits PS0-PS2, so that the delay signal in the NOR gate series 11 is selected in the NOR gate 12 and output to a NOR gate 14.

The first delay portion 1 and second delay portion 2 share the NOR gate 14. The NOR gate 15 of the second delay portion 2 functions to output externally, any clock signal (*CLK0-*CLK7) delayed to eight steps of *CLK0 selected by the above-mentioned PS0-PS2, because the phase adjusting signal of the other (p) bits, applied to the second delay portion 2, i.e. PS10, by one bit is maintained at "0".

When the above-mentioned selection signal PS10 for the second delay portion 2 is input as "1", the delay means is formed by inserting a capacitor Co (commonly connected to NOR gate 16), for example, several pF, in to an emitter follower output terminal, which is connected parallel to a base of the output transistor, thus forming an emitter follower of an internal connecting element in the NOR gate 14 and 15, outputting the above-mentioned *CLK0-*CLK7, for example, an emitter coupled logic circuit (ECL), via the a NOR gate. A further delay time, for example, 0.5 step, can be inserted to the step delay signals *CLK0-*CLK7 from the first delay portion 1.

The details of the delay portion of the 0.5 step delay are disclosed in Japanese patent application No. 59-158208 "Phase Variable Circuit" filed by the same applicant as of the present invention, therefore, an explanation thereof will be omitted. The phase adjusting due to the first delay portion 1 and the second delay portion 2 can obtain, when the delay time per one NOR gate 11 of the first delay portion 1 is set as ts, a selection clock signal (CLK1) set at every $1/2^P$ step in the range from a miminum 0 to a maximum $(m − 1/2^P)$, by 4 bits of PS0-PS2, and PS10.

The above explanation given for the case wherein the number (p) of selection signals of the second delay portion 2 is, 1, and the case when the number is extended several times is explained in FIG. 3B.

In FIG. 3B, as in FIG. 3A, a selection signal PS11 and a NOR gate 17 corresponding to the selection signal PS11 are added, one output is added for the NOR gates 14, 15, and further, the capacitance C0', which is commonly connected to the output of the NOR gate 17, is added.

This capacitance C0' has a similar function to that of the afore-mentioned capacitance C0, but the value of the capacitance is varied so that the variable step width is 0.25 step.

Accordingly, by the PS10 and PS11 in the second delay portion 2, 0-0.75 steps can be set at a 0.25 step interval.

Further, in addition to the circuit already mentioned, a person skilled in the art will realize that the circuit such as shown in FIG. 3C can be used as the circuit of the second delay portion 2.

In FIG. 3C, C1-C4 are stray capacitances formed by wiring patterns, etc., in the LSI. When these capacitances (concretely the length of the wiring pattern) are set at different values, and a signal transmission delay time (from the input of the NOR gate 18 to the input of the NOR gate 19) of the NOR gate 18 is made difficult by 0.25 steps, the function equivalent to the circuit shown in FIG. 3B can be obtained.

In the parallel system of FIG. 2A, the selection signal for the phase adjust is set as follows. First, all latches including the address type scan in/out latch circuits 3a–3d in the apparatus 0 are cleared to a set state (for example "1") by the set signal (SET). Next, the scan address signal (SAD) is applied to the decoder 4 and the scan in data (SI) is input to sequentially select the natural scan address (Sada–Sadd) for the latches 3a–3d for which the content is to be inverted ("1"→"0"), amount.

Accordingly, the content of the desired latch can be inverted from "1" to "0", and finally, any selection signal can be set in the latches 3a–3d.

Further, the above-mentioned set signal (SET) may be made a reset signal (which clears the content of the latch to zero) when using each scan in/out latch. In this case, the scan in circuit is formed such that the content of the latch is inverted from "0" to "1".

In the scan out operation, the scan out signal (SO) carries out the input of the scan addresses Sada–Sadr of a sequential decoder 4 from all latch circuits 3a–3r to the corresponding terminals, and gathers the signals from the scan out outputs Soa–Sor by dot OR manner, to be output.

Further, when the latch circuits 3a–3r cannot operate in the dot OR manner as a TTL circuit, the above-mentioned SO is output via an OR gate.

As the phase adjusting circuit due to the parallel scan as shown in FIG. 2A is formed as mentioned above, the controlling portion of the apparatus 0 not shown in the drawing is operated as follows. In the initial setting of the apparatus 0, for example, the set signal (SET) is applied to all latch circuits 3a–3r, then the scan in signal (SI) is sequentially input together with the scan address signal (SAD), so that the selection data is set in the latch circuits 3a–3r. Then, the delay time corresponding to the selection data is selected by the first delay portion 1 and the second delay portion 2, and in the range of $0-(m-1/2^P)$ for *CLK0. Next a CLK1 having a delay time of $1/2^P$ step is sent, via the OR gate 5 of the buffer function, to the input terminals *CLKe–*CLKr of the other latch circuits 3e–3r of the apparatus 0.

Accordingly, the above-mentioned SET, SI and SAD for selecting and setting the above-mentioned CLK1 can directly use the conventional scan in/out function. Thus the increase of the input/output terminals in the apparatus, 0, if the conventional SAD is more than 3 bits, corresponds to the increase of the four scan addresses Sada–Sadd, so that the increase of the SAD is only one bit at maximum. Then, the number of input/output terminals in the apparatus of LSI level is not largely increased, and thus the apparatus can be easily combined with the LSI, and the delay time for the clock signal *CLK0 can be set by the external selection signal. Therefore, a clock phase adjusting circuit having good operational characteristics can be realized.

The latch circuits 3a–3d which hold the selection signal applied to the first delay portion 1 and the second delay portion 2 can be also realized by selecting from and holding the other portion, for example, the control portion.

Next, an explanation will be given of the phase adjusting circuit in a further embodiment realized by the series type scan corresponding to the parallel type scan-in, by referring to FIG. 2B.

A scan in signal (SIa) and a scan out signal (SOa) shown in FIG. 2B are connected in series, and in a ring manner with shift type scan in/out latch circuits 3aa–3ar. These latch circuits, together with the other shift registers included in an external control portion, or controlled in the external control portion, form a scan chain, and the above-mentioned shift registers also apply the scan clock signal (SCK) output from the scan clock generating portion, under the control of another control portion to the above-mentioned scan in/out latch circuit 3aa–3ar similarly. Therefore, the above-mentioned SIa data is incremented by one step at every one clock of the SCK, so that the above-mentioned SIa data is circulated in the scan chain by the scan clock SCK of the sum (r+s) of (r) number of scan in/out latch circuits 3aa–3ar, and the number of stages of the above-mentioned shift register, for example, (s).

Therefore, the data set on the shift register by the control portion is shifted by the application and the control of the scan clock (SCK), and the data can be set in any of the scan in/out latch circuits 3aa–3ar on the scan chain, or in the above-mentioned shift register.

That is, the above-mentioned external control portion sets the signals corresponding to PS0–PS2, PS10, as in the afore-mentioned embodiment, in the first delay portion 1 and the second delay portion 2 and sets the above-mentioned SIa in the scan in/out latches circuits 3aa–3ad, to input the selection data for the phase adjusting. Then, the delay time corresponding to the selection data is selected in the first delay portion 1 and the second delay portion 2 and, as in the above-mentioned parallel system, in the range of $0-(m-1/2^P)$ for *CLK0, CLK1 having any delay time of $1/2^P$ step is sent via the OR gate 5 of the buffer function to input terminals *CLKal–*CLKar of the other latch out circuits 3al–3ar, in the apparatus 0a.

Further, during the scan in/out, system clock CLK1, used for the logic operation, is not necessary and during the logic operation using CLK1, the scan in/out operation is not carried out, so that the phase adjust condition of the CLK1 does not vary.

However, when the scan in/out and the logic operation are alternately repeated, the selection data for CLK1 must be set at a constant value each time by the scan in operation.

Thus, when the data in the once set scan in/out latch circuits 3aa–3ad and the logic operation, following the scan in/out executed thereafter, are alternately repeated, if an insertion or a detour of the above-mentioned latch circuits 3aa–3ad into the scan chain by another control signal and the application/stop maintenance of the scan clock (SCK) are interlocked, the latch circuits 3aa–3ad are inserted in the scan-in only at the time of the clock phase adjust. As a result, the selection data by the scan in signal (SIa) is set, and thereafter, the latch circuits 3aa–3ad are made to withdraw from the scan chain so that the selection data may be fixed and held.

Next, another embodiment of the present invention will be explained with reference to FIG. 4A and FIG. 4B.

In the former embodiment, the selection data which is input as the scan in signal (SI or SIa) is processed as an image of a firmware data which is held in one part of the control portion, stored together with the control program in the memory portion belonging, for example, to an external controlling portion. However, in this embodiment, the selection data from the clock phase adjust, corresponding to each apparatus is stored in the apparatus, here another memory portion (hereinafter called MEM 6b, c) provided in the apparatus 0b, 0c, and, for example, at the initial set time for each apparatus, the external control portion at once sends the predetermined selection data set in MEM 6b, c in each apparatus 0b, 0c as the scan out data (SO or SOa), regardless of the selection data in each apparatus. Thereafter, the scan out data (SO, SOa) are used as the scan in data (SI, SIa), only by a predetermined process, so that the clock phase adjusting system which carries out the operation similar to the former embodiment as explained in FIGS. 2A and 2B can be provided.

In the clock adjusting systems by the scan in/out of the parallel system shown in FIG. 4A of the present invention, and the scan in/out of the series system of the embodiment shown in FIG. 4B of the present invention, symbols common to the above-mentioned embodiments show the same elements.

The parallel system shown in FIG. 4A is different in that the MEM 6b is added to the construction of the apparatus 0 corresponding to FIG. 2A.

Addresses A0-An in this MEM 6b use one portion of the scan address signal (SAD) applied to the decoder 4b, but are allocated so as not to overlap the address of the scan out latch circuits 3a-3r.

If necessary, a chip select (CS) signal forming circuit may be added.

Further, if necessary, an address signal exclusive to the MEM 6b may be used.

In the present embodiment, the selected data in the first delay portion 1 and the second delay portion 2, set to the latch circuits 3a-3d in FIG. 2A, are accessed to the MEM 6b to be output from the data output terminal (DO) and to be read out to an external control portion, not shown in the drawing, as the scan out signal (SO). Thereafter, as in the embodiment shown in FIG. 2A, the data which the external controlling portion reads out by the above-mentioned SO is input as the above-mentioned SI, and the delay time according to the selected data, due to the above-mentioned SI, is selected in *CLK0 applied to the first delay portion 1 and the second delay portion 2 to output CLK1. Such a clock phase adjusting system can be thus obtained.

The selected data to be stored in the memory MEM 6b is stored by the signal which is necessary for the write enable (We) for the MEM 6b, the data input (Di), and addresses (A0-An), wherein the signal is output and supplied by the above-mentioned control portion.

The series system of FIG. 4B is different in that the MEM 6c is added to the construction of the apparatus 0 in the corresponding FIG. 2b.

When the operation wherein the selected data is memorized by the MEM 6c is carried out, a latch circuit 3ae in the scan chain configured as in FIG. 2B is allocated to a data input (Di), the latch circuits 3af-3aj are allocated to the addresses (A0-An), and the latch circuit 3ak is allocated to the data output (Do).

The above-mentioned external control portion, not shown in the drawings, executes the scan in by applying the scan clock (SCK) using the selection data as the scan in data (SIa). Next, the external control portion applies the scan in via a latch circuit 3ae to the data input (Di) of the MEM 6c and via the latch circuits 3af-3aj to the address (A0-An) of the MEM 6c, and the selected data is stored in the MEM 6c by applying the write enable (We).

When the phase is adjusted, the selection data stored in the MEM 6c is shifted by the above-mentioned control portion applying the scan clock (SCK) sequentially to the MEM 6c, using the above-mentioned write enable as a disenable (that is read out mode). Then the selection data due to the read out signal (Do) according to the address (A0-An), supplied via the latch circuits 3af-3aj, is set in the latch circuit 3ak to be read out as the scan out signal (SOa).

At this time, the CLK1 signal is necessary for taking in the read out signal (Do) of the MEM 6c to the latch 3ak, however the phase of the CLK1 signal at this time need not be adjusted.

When the selection data is set, via the external controlling portion not shown in the drawing, and by the shift operation in the latch circuits 3aa-3ad as the scan in data (SIa), and input to the first delay portion 1 and the second delay portion 2 as PS0-PS2, PS10, a clock phase delay system can be obtained which sends out a CLK1 with a delay which is applied to the *CLK0 in accordance with the predetermined selection data stored in the MEM 6c.

Also in this embodiment, the following function may be allowed, that is, the latch circuits 3aa-3ad and 3ae-3ak are made valid only when operating the scan in/out for the selection data, and the selection data is read out from the MEM 6c and withdrawn from the scan chain. This selection data is read except for setting in the first delay portion 1 and the second delay portion 2, so that the selection data in the latch circuits 3aa-3ad is made fixed and held.

The above mentioned explanation is for the case where one system is used for obtaining the clock signal CLK1 phase adjusted by *CLK0. However, if necessary, the clock signal may be realized by providing a plurality of means as shown in FIG. 1B in the prior art and obtaining another clock signal phase adjusted with a different phase.

As explained in detail above, the characteristic feature of the clock phase adjusting system according to the present invention is in a logic circuit providing a scan in/out means, (n+1) special scan out latch circuits are provided. These scan in/out latch circuits include first delay means which selectively outputs an input clock as a delay clock output of a maximum $m=2^n$ steps in accordance with the (n) bit selection signal; second delay means which selectively outputs the input clock signal as the delay clock signals of further minimum $1/2^P$ steps of a minimum step width by the first delay means in accordance with the (P) bit selection signal. The second delay means is connected in cascade with the first delay means, so that the delayed clock signals of $1/2^P$ steps are output for the input clock signal by only setting, in the above-mentioned (n+p) scan in/out latch circuits, the selection data which is used to obtain a delay clock signal. Therefore, compared with a conventional clock phase adjusting means, in the clock phase adjusting system of the present invention wherein the number of terminals for leading out externally can be suppressed to a minimum, the coexistence with the LSI is excellent. Further, a delay time can be finely and selectively set by the external control means and the phase adjusting means can be effectively obtained without the accompanying connection changes.

Although certain preferred embodiments have been sown and described, it should be understood that many changes and modifications may be made therein without departing from the scope of the appended claims.

I claim:

1. A clock phase adjusting system, comprising:

means, connected to receive an input clock signal, for delaying the input clock signal by a selected time in accordance with a given delay time selection signal and for outputting a delayed clock signal, said delay means including:

first delay means for coarse adjustment, said first delay means selectively outputting the input clock signal in accordance with an (n) bit selection, wherein n is an integer greater than or equal to one, as delay clock signals having a maximum of $m = 2^n$ steps, wherein m is an integer greater than or equal to one;

second delay means for fine adjustment, said first and second delay means connected in cascade, said second delay means selectively outputting the input clock signal in accordance with a (p) bit selection signal, wherein p is an integer greater than or equal to one, as delay clock signals having a minimum of $\frac{1}{2}^p$ steps having a minimum step width of said first delay means;

scan in/out latch circuits, connected to said means for delaying an input clock signal, for providing said delay time selection signal to said delay means; and means, connected to said scan in/out latch circuit, for applying a setting signal and for setting selection data corresponding to said delay time selection signal to said scan in/out latch circuits during a scan-in operation, said delaying means outputting the delay clock signal having a selected delay time.

2. A clock phase adjusting system according to claim 1, wherein at least (n+p) said scan in/out latch circuits are provided which correspond to said first delay means and said second delay means.

3. A clock phase adjusting system according to claim 2, further comprising:

at least one other scan in/out latch circuit connected to receive a first address signal;

memory means, connected to said first delay means, for inputting and outputting selection data to said first delay means and said second delay means in accordance with the first address signal input to said at least one other scan in/out latch circuit and a second address signal; and a logic circuit for performing a scan-in operation, wherein, when said logic circuit carries out the scan-in operation, said selection data, which is output by said first address signal corresponding to said memory means, is input to said (n+p) scan in/out latch circuits, and said delayed clock signals having a minimum of $1/2^p$ steps are output by said first delay means and said second delay means.

4. A clock phase adjusting system having a logic circuit providing scan in/out means, comprising:

first delay means, connected to receive an input clock signal, for selectively outputting an input clock signal as a delayed clock signal having a maximum of $m = 2^n$ steps in accordance with an (n) bit selection signal in the logic circuit providing scan in/out means;

second delay means, connected in cascade with said first delay means, for selectively outputting an input clock signal as a delayed clock signal having a minimum of $1/2^p$ steps and a minimum step width; and (n+p) scan in/out latch circuits, connected to said first delay means and said second delay means, for providing the selection signal to said first and second delay means, data corresponding to said selection signal being input to said (n+p) scan in/out latch circuits during a scan-in operation in said logic circuit, and the delay clock signal having $1/2^p$ steps being output from said first delay means and said second delay means.

* * * * *

UNITED STATES PATENT AND TRADEMARK OFFICE
CERTIFICATE OF CORRECTION

PATENT NO. : 4,859,954
DATED : AUGUST 22, 1989
INVENTOR(S) : TATSURO YOSHIMURA

It is certified that error appears in the above-identified patent and that said Letters Patent is hereby corrected as shown below:

Col. 1, line 60, after "circuit" insert --which--.

Col. 3, line 15, "ae" should be --are--.

Col. 4, line 28, "via the a NOR" should be --via a NOR--.

Col. 5, line 1, "difficult" should be --different--;

line 12, delete "amount".

Signed and Sealed this

Third Day of July, 1990

Attest:

HARRY F. MANBECK, JR.

Attesting Officer

Commissioner of Patents and Trademarks